Frank A. Howard, Inventor

By *Kenyon & Kenyon*
Attorneys

Frank A. Howard, Inventor

Frank A. Howard, Inventor

By Kenyon & Kenyon
Attorneys

Frank A. Howard, Inventor

By Kenyon & Kenyon
Attorneys

United States Patent Office 3,185,960
Patented May 25, 1965

3,185,960
TIRE PRESSURE ALARM
Frank A. Howard, New York, N.Y.; Irma Amelie Howard, Frank A. Howard, Jr., and The Chase Manhattan Bank, executors of said Frank A. Howard, deceased
Original application May 16, 1956, Ser. No. 585,223, now Patent No. 2,969,824, dated Jan. 31, 1961. Divided and this application Dec. 9, 1960, Ser. No. 74,911
3 Claims. (Cl. 340—58)

My invention relates to improvements in pneumatic tires. In my copending application Serial No. 134,957, now United States Patent No. 2,811,189, issued October 29, 1957, I have shown a strong and durable type of safety ring used in combination with a tubeless tire to carry the load for a short time in the event of sudden tire failure, as by blowout. In my copending application Serial No. 569,074, now United States Patent No. 2,934,127, issued April 26, 1960, I have shown a dual tire with a similar safety ring used as an inner tire which is cut off from the outer tire chamber by a dual inflation valve which prevents escape of air from the inner tire on deflation of the outer tire. This application is a division of my pending application Serial No. 585,223, now United States Patent No. 2,969,824 issued January 31, 1961.

In my present application I have shown an improved dual-tire, dual-valve, construction embodying a deflation alarm which gives notice of loss of pressure in the outer tire. My present invention will be fully understood from the following specification, taken in connection with the annexed drawings in which.

Figure 1:
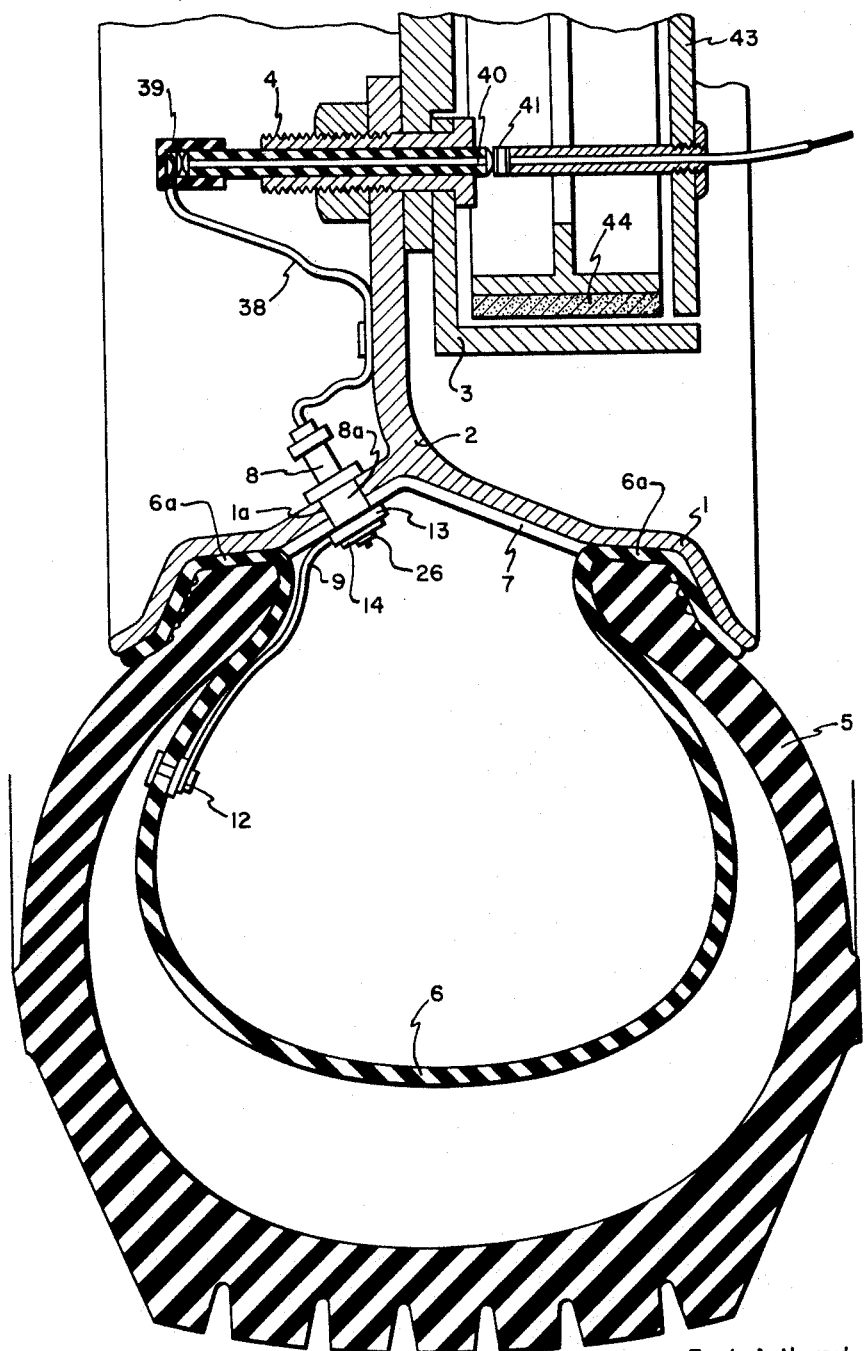
FIGURE 1 is a fragmentary cross-section through a rim tire, disk wheel, and brake drum.

Referring to FIGURE 1, numeral 1 indicates a one-piece, drop-center metal rim carried by a demountable metal disk wheel 2 which is detachably secured to the wheel hub and to the brake drum 3 carried by the wheel hub. The mounting arrangements are commonly a plurality of wheel studs mounted in the hub or brake drum. For the purposes of my invention one such mounting stud, designated 4, is also used to carry the live wire of the deflation alarm circuit, as will later appear.

Figure 5:
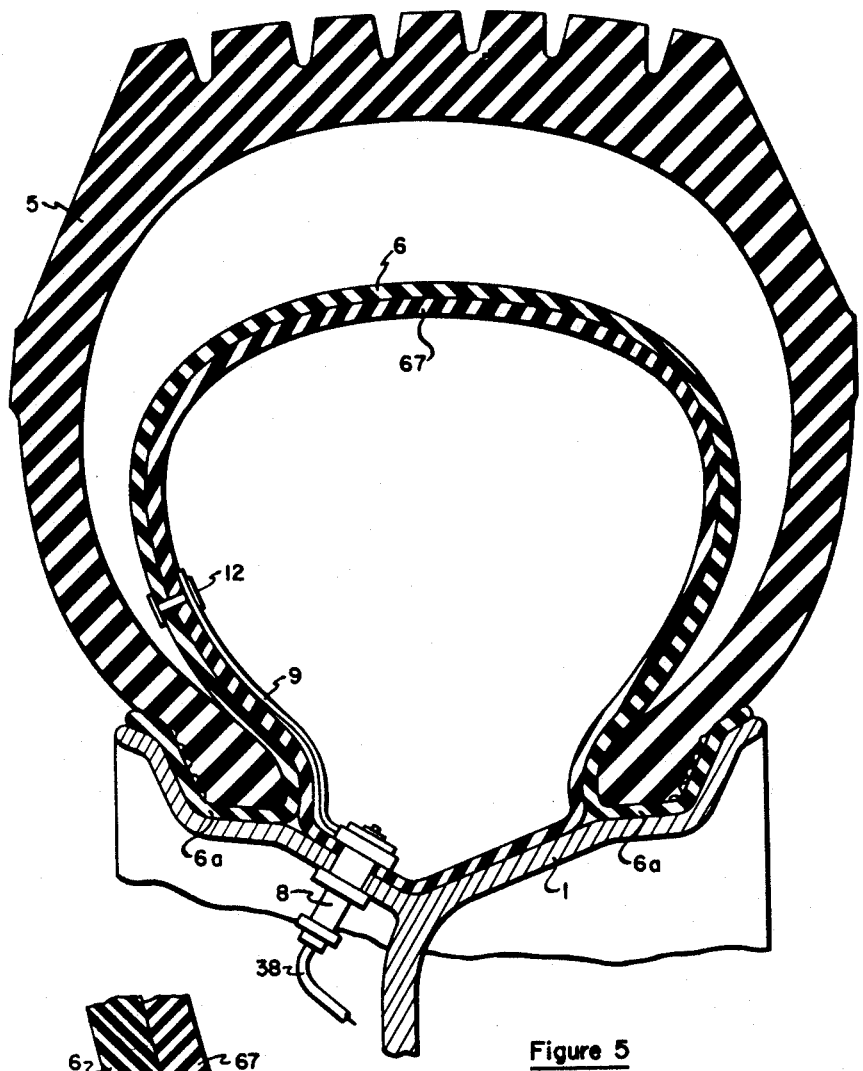
FIGURE 5 is a cross-section of a modified tire construction using a complete inner tube inside the safety ring.

There is mounted on the rim 1 a straight-side tubeless tire 5 of ordinary construction and an inner tire comprising a torus 6 having a cross section corresponding to the form of the inverted Greek capital letter omega, the marginal channels 6a of which embrace the beads of the tire 5, as shown and described in my earlier-filed applications referred to. The torus 6 is customarily made of two plies of rubber-coated cord fabric vulcanized together in a mold. In FIGURE 1 I have shown the open bottom or inner circumference of the fabric ring 6 closed by a strip 7 of rubber vulcanized or cemented at its margins to the inner marginal portions of the safety ring 6. The strip 7 thus converts the safety ring into a complete airtight torus, but it will be observed that the bottom strip 7 seats directly on the rim 1 save at its margins where it seats against and is bonded to the omega ring 6. Although the strip 7 therefore prevents leakage of air under the tire beads from within the inner chamber formed by the safety ring 6, the ring itself still functions as before to carry the load in the event of failure or deflation of the tire 5, and utilizes the inextensible beads of the tire 5 as the anchorage which holds the safety ring firmly on the bead seats of the rim 1. Thus the bottom strip 7 may be regarded functionally and structurally as nothing more than an auxiliary seal to prevent air from leaking out under the channels of the ring. Accordingly, the bottom strip 7 may be of relatively thin sheet-rubber without reinforcement. In place of the rubber strip 7 I may use a separate complete inner tube of sheet-rubber, as shown at 67 in FIGURE 5. The safety ring 6, the tire beads, and the rim, carry all mechanical stresses, and the inner tube 67 has the sole function of forming a complete inner air barrier which unfailingly holds air in the inner tire chamber in the event of puncture or failure of the outer tire casing and also in the event of air leakage under the beads.

Figure 2:
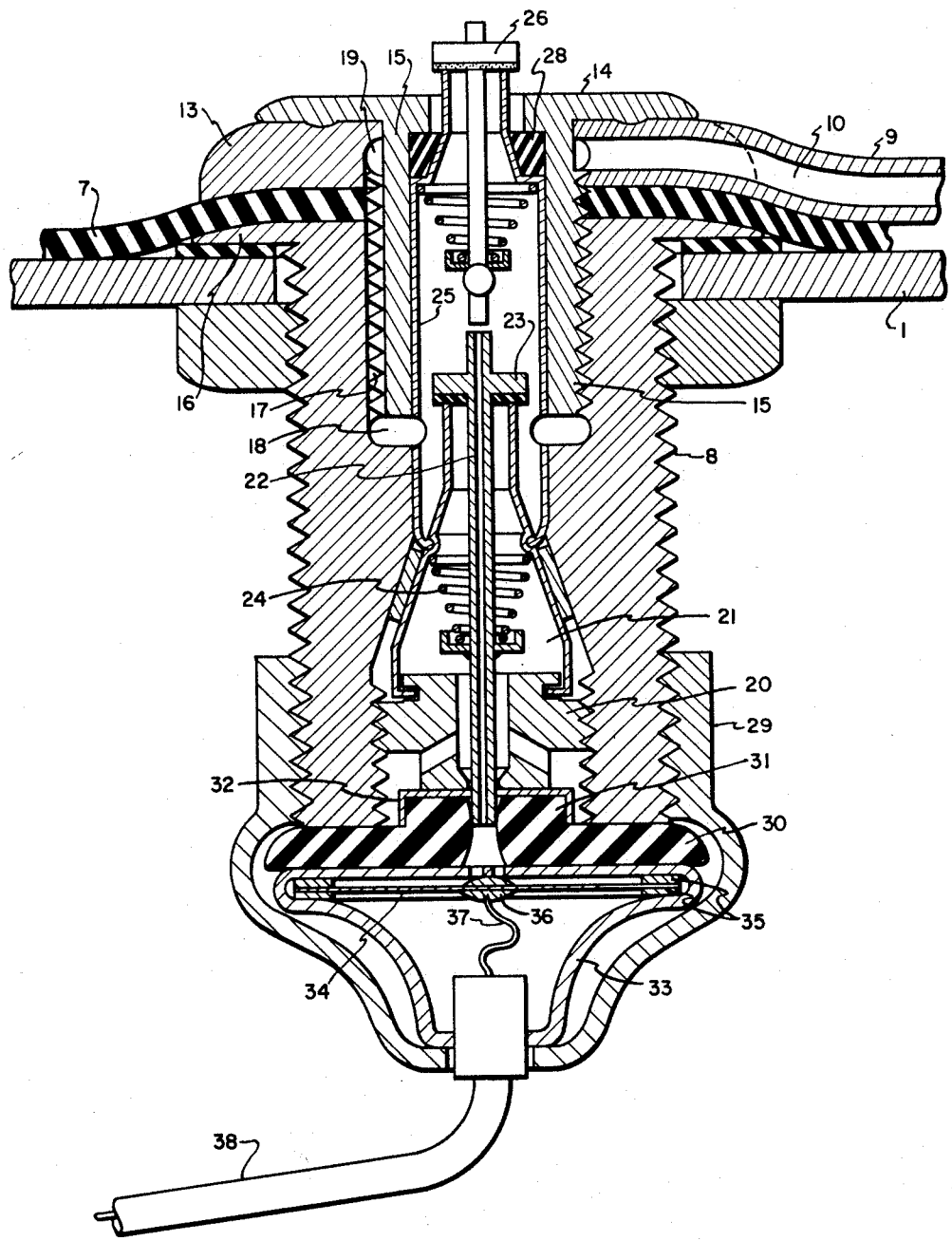
FIGURE 2 is an enlarged cross-section through a dual valve which may be mounted in the rim and may also be mounted in a complete inner tire.

For use with the dual tire construction described, I employ a dual inflation valve designated 8, the barrel 8a of which is mounted in opening 1a in rim 1, shown in detail in FIGURE 2. Where the strip 7 is used, as shown in FIGURE 1, this dual valve is secured first in that strip. A moulded rubber duct or conduit 9, sufficiently rigid to avoid collapsing the air channel 10 under external air pressure, connects the bore of a metal fitting 12 which passes through the safety ring 6 with a flat circular head 13 which forms the air connection to the dual valve. The rubber head 13 is gripped between the metal head 14 of the threaded nipple 15, and the metal head 16 of the valve body 8. Where the inner strip 7 or complete inner tube 67 is used, the rubber head 13 seats on the strip or tube and forms an airtight joint with it when the nipple and valve body are screwed together. The mating external threads of the nipple 15 and internal threads of the valve body 8 are interrupted (breech-block type) threads, having multiple interruptions wide enough angularly so that at any angular position there is an axial passage such as the passage 17 through the threads and connecting the groove 18 in the lower end of the threaded portion of the valve body with a moulded groove 19 in the flat head 13 which in turn connects with the air passage 10 to the metal fitting 12. The operating parts of the dual valve are assembled in a single removable valve core. This core has the usual core-nut 20 threaded into the open end of the valve body 8. The nut 20 carries a hollow sheet metal cone frustum 21 with the main valve seat at its open inner end. A central valve stem 22 carries the movable obturating element of the valve in the form of a valve head 23 which closes this open end and is held against its seat by the valve spring 24. The valve core cone 21 also carries a cylindrical extension 25 which loosely fits the bore of the nipple 15. The extension 25 also ends in a cone frustum, the open outer end of which is closed by a spring-pressed valve 26. The inner end of the stem of the valve 26 clears the upper end of the stem 22 of the main valve 23, so that there may be slight opening of valve 23 before valve 26 is pushed open.

To seal the end of the cylindrical valve core extension 25 in the open end of the nipple 15, a rubber ring gasket 28 of considerable depth may be confined between a shoulder on the end of the cylindrical valve core extension 25 and a flange in the open end of the nipple 15.

Figure 6:
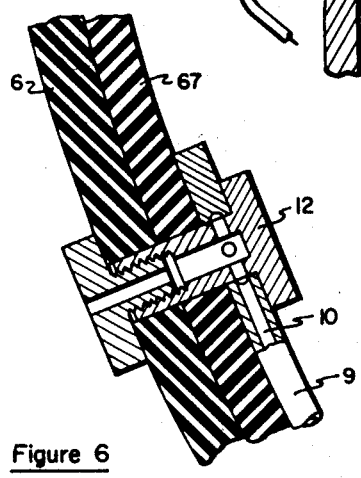
FIGURE 6 is an enlarged fragmentary section of the metal fitting which is used to deliver air to the outer tire chamber.

The cylindrical valve core extension 25 has perforations which register with the groove 18, so that the chamber within the valve core between the main valve 23 and the outer valve 26 communicates with the air passages 17, 19, 10 and thus with the outer tire chamber through the hole in the metal fitting 12 shown in FIGURE 6. The stem 22 of the main valve 23 may be made of hollow wire, so as to provide a minute capillary bore extending from one end to the other of the valve stem. It will be understood that while this method of by-passing the valve 23 through a very small passage has special advantages, as will later appear, the by-pass may be accomplished in other ways, as for example by a minute hole through the valve head.

For cooperation with the form of dual valve above described, I may use a cup-shaped valve cap having a circuit closing device in the form of self-contained pressure-sensitive element capable of closing an electric circuit. Such a valve cap is designated 29 in FIGURE 2. It is threaded onto the open end of the valve 8 in the usual way. Inside the valve cap there is a special form of rubber sealing gasket 30 in the form of a thick disk with a neck 31 which extends into the bore of the valve 8 and is surrounded by a small metal ferrule 32 which seats on the outer end of the valve core nut 20 when the disk itself seats on the open end of the valve 8. There is a central opening through the disk 30 and its neck 31 and ferrule 32 which loosely fits around the projecting end of the valve stem 22. The rubber disk 30 is forced inward by the flat base of a stiff metal cone-frustum 33. A pressure-sensitive diaphragm in the form of a flexible metal, plastic, rubber, or mica disk 34 is gripped between soft insulating rings 35 in the margins of the base of the cone 33. A metal button 36 fastened in the center of the pressure disk 34 is connected by a thin flexible wire 37 with the live wire 38 of the deflation alarm circuit. The base of the cone 33 has small perforations which register with the hole through the gasket 30, and the metal button 36 rests with some slight pressure on this perforated central area of the cone base 33 when the parts are assembled. The valve cap 29 may be swelled outward to form an internal chamber which loosely surrounds the disk 30 and the base of the cone 33, which are larger in diameter than the valve body 8. The end of the valve cap 29 is then domed and centrally bored to receive the wire 38 and to bear on the top of the conical metal member 33. By this construction the valve cap 29 may be screwed and unscrewed on the valve body without twisting the wire 38 and without turning the gasket disk 30. As the valve cap is screwed down it turns relatively freely on the outer end of the cone 33 and presses the cone base against the rubber disk 30, thus sealing the open mouth of the valve body 8. At the same time the neck 31 of the disk 30 is compressed against the base of the ferrule 32 which bears on the end of the valve core nut 20, and since the ferrule prevents radial expansion of the neck 31, the axial pressure on the neck causes inward radial flow of the rubber, so that the central bore through the disk contacts and seals around the end of the valve stem 22. This seal around the valve stem 22 is thus created solely by inward radial flow of the rubber and there is no danger of opening the valve 23.

Figure 4:
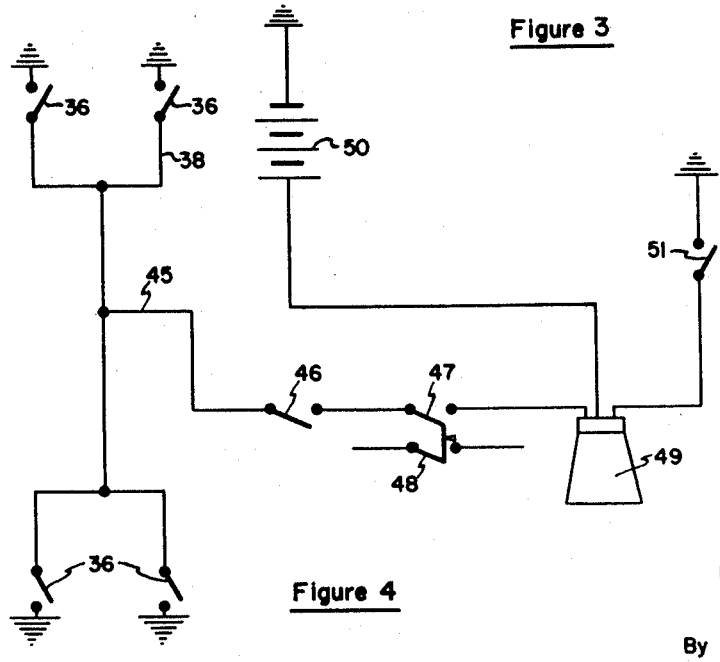
FIGURE 4 is a diagram of the electrical circuits used in the deflation alarm system.

Referring to FIGURE 1, the wire 38 may be adhesively or mechanically secured to the wheel disk 2 up to a point near the wheel stud 4. The loose end of the wire near the wheel stud may be secured in a connection cap 39 which snaps over the end of the insulating core of the wheel stud and thus connects with an insulated central conductor 40 passing through a bore in the core of the wheel stud and terminating in an insulated contact button on the inner end of the stud. Once each revolution this contact wipes across a bow spring contact member 41 shown as supported in a fixed stud which passes through a stationary flange 43, on the vehicle axle, which closes the open face of the brake drum and houses the brake band 44 and its supporting and actuating mechanism. The deflation alarm circuit is shown in the electric circuit diagram FIGURE 4. The contact 36 carried by the pressure-sensitive disk 34 grounds the line 38 when the contact bears on the base of the cone 33. The ground is effected through the metallic contact between cap 29 and cone 33 at the open end of the cap, and by the valve 8, thence through the rim of the disk wheel in which the valve is fastened as shown in FIGURE 2.

The wires 38 from each valve cap pass through the connections 39, 40, 41, to a single line 45 in which there is interposed a manual cut-out switch 46 and a second switch 47 which is mechanically connected with the vehicle motor ignition switch 48 so as to turn off and on with that switch. Beyond the switch 47 the line leads to the vehicle horn 49, then to the vehicle battery 50, one side of which is grounded to the frame of the vehicle as usual. The vehicle horn 49 has the usual manual operating switch or horn-button 51 which grounds the horn circuit in the usual way to sound the horn in a continuous note at will and is unaffected by the deflation alarm circuit. It will be noted, therefore, that while the vehicle horn is used as the tire deflation alarm, it actually gives a characteristically different note when sounded through the deflation alarm circuit than when sounded manually.

In general, the purpose of the combination above described is to reduce the hazards involved in the use of pneumatic vehicle tires to such a point that enforced vehicle stops, to make on-the-spot tire repairs or changes, need no longer be contemplated. This avoids the need to carry in the vehicle at all times a spare wheel and tire, jack and accessory tools. To accomplish this result I have shown and described in the foregoing a combination including the following major elements.

First, a tubeless tire of conventional form.

Second, a strong and durable cord fabric safety ring within this tire, the ring being of the cross section of the Greek capital letter omega. The channel-shaped margins of the ring embrace the beads of the tubeless tire so that these beads now have the function of anchoring and sealing the margins of the safety ring as well as anchoring and sealing the tire itself on the rim. To provide additional insurance against complete tire deflation through leakage of air under the tire beads or under the channel margins of the safety ring, I may also close the open bottom of the safety ring with a thin air-impermeable strip of sheet rubber in which the dual inflation valve is fastened, or I may use a complete inner tube of thin sheet rubber.

Third, to permit simultaneous inflation and deflation of both the outer and inner chambers of the tire equipped with the safety ring, I have shown a dual valve which holds air in the inner tire chamber if the outer chamber becomes deflated.

Fourth, should the air pressure in the outer tire chamber drop to a low level for any reason, the inner tire chamber is capable of carrying the load of the moving vehicle for a considerable time. It is desirable, however, to warn the driver of loss of pressure in the outer chamber so that he may avoid prolonged high speed driving and take the first convenient opportunity to have the tire repaired. This warning is given by a deflation alarm circuit which sounds the horn of the moving vehicle with a characteristic pulsing or vibrating note when the pressure in the outer tire chamber falls below a predetermined minimum. The manual cut-out switch in the alarm circuit can be at once opened to avoid continued sounding of the vehicle horn.

The manner of assembly and operation of the combination which attains the final results above described is as follows:

The inflation valve 8 is fastened in the bottom strip 7 of the safety ring before the ring is mounted on the beads of the tire. At the time the valve is so mounted, the conduit 9 connecting the valve with the metal fitting 12 may be either left free or cemented to the inside of safety ring. If the complete inner tube 67 (FIGURE 5) is used, the valve 8 and fitting 12 are first installed in the inner tube, and the inner tube then put in the safety ring and secured by the fitting 12 which passes through a hole in the ring. The mounting of the tire, with its safety ring, on the rim 1 is carried out just as though the safety ring were an ordinary inner tube. Inflation is carried out as the final part of the mounting operation by applying an air pressure connection to the open end of the valve 8, thus forcing the tire beads outwardly until they reach the rim flanges. This may be done before the valve core is inserted in the valve. If the valve core is in place, the stud in the center of the standard tire inflation hose connection operates in the usual way to press the valve stem 22 inward, which opens both the outer valve 23 and the inner valve 26 so that air is admitted freely and simultaneously both to the inner and outer tire chambers. By constricting the bore in the metal fitting 12 the inner chamber may, if desired, be caused to inflate faster than the outer chamber but the inflation pressures in the two chambers will equalize as the inflation rate tapers off.

When the air hose is removed from the valve there will be a very small flow of air outward from the outer tire chamber through the capillary bore in the valve stem 22. This may reduce the air pressure in the outer tire chamber below that in the inner chamber by a small controllable amount, which is itself usually desirable. The valve cap 29, which is always conveniently at hand because it is held by the loose end of the wire 38, can be screwed on rapidly enough to prevent excessive loss of pressure from the outer tire chamber. Because of the clearance between the end of the valve stem 22 and the stem of the valve 26 it is also possible to bleed air from the outer tire chamber by slightly depressing the valve stem 22, without losing air from the inner chamber. As the valve cap is screwed up tight it seals both the open end of the valve in the usual way, and also separately seals the end of the valve stem 22. The seepage of air through the capillary bore of the valve stem 22 builds up a pressure under the pressure-sensitive disk 34, distending this disk to hold the contact button 36 free of the metal base of the cone 33. Thus the ground connection through the valve and rim to the vehicle frame is broken.

Tire mounting and inflation is normally carried out only when the engine is stopped, so the deflation alarm circuit will then be open at the switch 47 which is mechanically operated by motion of the vehicle ignition switch 48.

It will be noted that the dual valve 8 and valve cap 29 provide two separate seals for both inner and outer tire chambers. The outer tire chamber is sealed both by the disk 30 seating upon the open end of the valve body 8, and by the compression of the rubber in the neck 31 of the disk around the valve stem 22. If either of these two seals is perfect there can be no loss of pressure from the outer tire chamber so long as the valve 23 is tight. Loss of air from the inner tire chamber to the outer tire chamber is prevented only by valve 26, but loss of pressure from the latter chamber to atmosphere is still prevented by the two seals provided by the valve cap 29.

Because of the relatively large depth of the rubber ring washer 28 great accuracy in the dimensions of the parts is not necessary. A reliable seal at this point may be obtained when the valve cone 21 seats on its conical seat in the valve body, as the nut 20 is screwed in. In the event the strip 7 is not employed, but only the omega ring itself, a shorter nipple 15 may be used, or a gasket of the same thickness as the missing strip 7 may be inserted. In either case it will be clear that the valve 8 is sealed in the rim 1 by an inner gasket under the head 16 and secured by an outer ring nut, as is standard practice in mounting a valve in a tubeless tire. It will also be seen that the dual valve core is bodily removable as a unit and should any part fail to seal or operate satisfactorily the valve core may be economically replaced rather than repaired.

Figure 3:
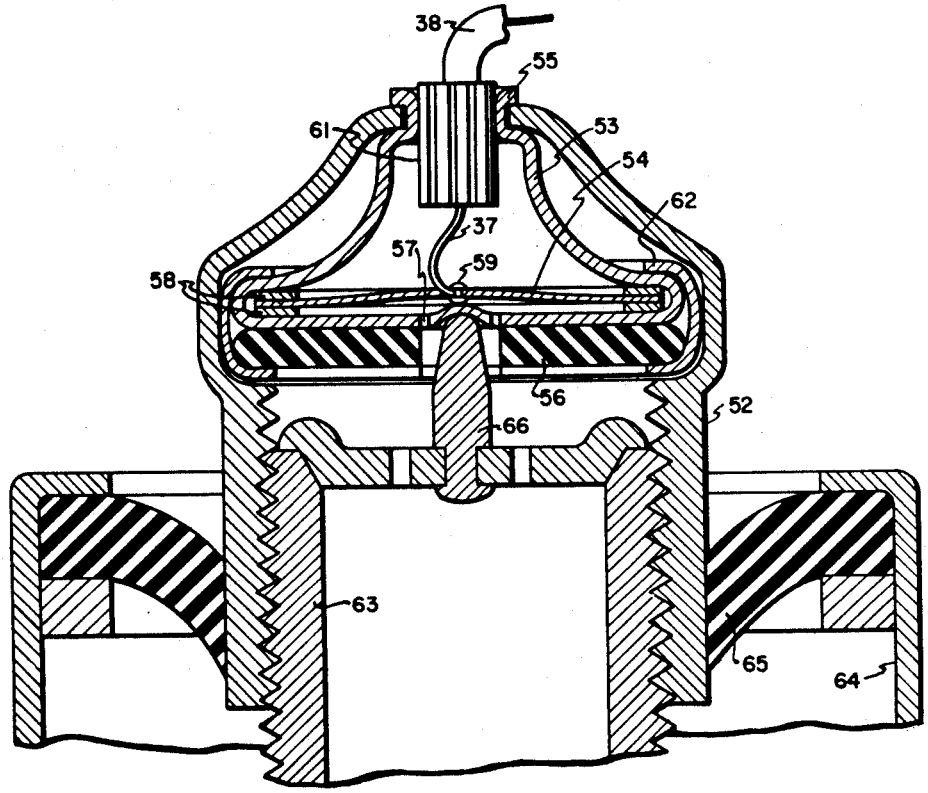
FIGURE 3 is an enlarged cross-section through a modified valve cap deflation alarm device showing the manner in which the electrical contacts are calibrated.

In FIGURE 3 I have shown a slightly modified form of valve cap and have shown how the pressure-sensitive switch is calibrated to remain open until the outer tire chamber pressure falls to the predetermined limit. In FIGURE 3 the valve cap is designated 52, the metal cone 53, and the pressure-sensitive disk 54. The cone 53 is flanged over slightly at the top as shown at 55 to lock the cap and cone loosely together. The valve cap rubber gasket 56 has a hole in the center which exposes the center of the base of the cone 53. In or near this exposed center of the base a circle of holes 57 may be punched which has the dual result of ensuring free access of air from the valve to the face of the disk 54 and also weakening the center of the cone base to make it easily bent. The disk 54 is mounted between soft gasket rings 58 and carries a metal contact rivet 59 in its center which also secures the wire 37. The external wire 38 joins the wire 37 in a connecting plug 61 which is externally serrated to make sure that the outer face of the disk 54 is always exposed to atmospheric pressure. The cone 53 may be assembled as a single unit with the disk gasket 56 by a metal ring 62 flanged over top and bottom to grip the entire assembly firmly together and especially to make certain that there will be no leakage of air between the parts of the assembly. The valve cap 52 is expanded to accommodate the assembly, which fits loosely within the cap.

To calibrate the deflation alarm switch, the valve cap is screwed on a dummy valve stem 63 which forms part of a fixture including an air pressure connection 64 terminating in a self-sealing rubber head 65. In the open end of the dummy valve 63 there is mounted a heavy central stud 66. As the valve cap 52 is threaded down on the stem 63, the stud 66 comes into contact with the center of the base of the metal cone 53, and, on continued turning of the valve cap, the stud bends upward this central area inside the circle of weakening punch holes 57.

Assuming that the air pressure within the connection 64 is held at some predetermined level, say 15 lbs. per square inch, the disk 54 will be distended by this pressure on its face so that the rivet 59 does not contact the center of the cone base. The deflation alarm circuit is therefore open at this point. As the valve cap is screwed down and stud 66 bends the weakened center of the cone base inward, however, contact will be reestablished and the alarm circuit thus closed. By this procedure the valve cap alarm device will have been calibrated so that it will thereafter hold the circuit open so long as the pressure under the disk 54 exceeds 15 lbs., but will permit the circuit to close when the pressure drops below that point. As will be seen in FIGURE 2, the by-pass through the valve 23 provided by the capillary bore of the valve stem 22 will hold the pressure under the disk 34 or 54 at the level existing in the outer tire chamber.

Valve cap deflation alarm devices calibrated for various pressure, as above described, may be carried in stock by tire and accessory dealers and supplied on demand to suit the wishes of any user. Because of the wide variations in service of vehicles the safe minimum tire pressure varies, even with tires of the same size. For convenience in changing valve caps the connection plug 61 (FIGURE 3) between the valve cap and the wire 38 may be made readily removable.

It will be seen that since both the dual valve core and the valve cap with its self-contained pressure-sensitive element are separate, relatively cheap standardized units which can be distributed nationally, the deflation alarm system does not depend upon expert maintenance but rather contemplates instead replacement of its two working components, if they should need servicing.

While I have shown and described in the annexed drawings and in these specifications many details of construction and arrangement of the various components of my improved dual-tire, dual-valve and deflation alarm system, it will be understood that this is all for the purpose of making the invention as clear as possible and that the invention is not to be regarded as limited to any of the details described and illustrated save in so far as such limitations are included within the terms of the appended claims, for obvious modifications will occur to one skilled in the art.

What I claim is:

1. A pneumatic tire deflation alarm system for a vehicle comprising in combination a wheel, a wheel hub having outer and inner faces, a circle of threaded studs mounted in the hub for securing the wheel to the outer face thereof, one of said studs having an opening therein, electrical contacts carried by the wheel, means for closing said contacts in response to a drop of the tire inflation pressure to a predetermined pressure, an insulated electrical conductor passing through said stud opening and having an insulated electrical contact adjacent the inner face of the hub and moving therewith, an electrical conductor connecting the electrical contacts carried by the wheel to said insulated conductor, a stationary electrical contact carried by the vehicle and lying in the path of rotation of the contact on the inner face of the hub, and an alarm circuit carried by the vehicle and adapted to be energized when the electrical contacts carried by the wheel are closed in response to the drop of the tire inflation pressure to the predetermined pressure and the insulated contact on the inner face of the hub and the stationary contact are intermittently closed during revolution of the wheel.

2. A pneumatic tire deflation alarm device comprising in combination a tubular inflation valve having an inner end portion for connection to a tire and an open outer end portion, said valve having an automatic inwardly opening check valve member for admitting free ingress of air through the open outer end portion of the valve in order to inflate the tire and for blocking egress of air from the tire after the tire has been inflated, said check valve member having a minute opening for bypassing the same, a removable valve cap for closing the open outer end portion of the inflation valve, a pressure-sensitive switch operatively connected with the interior of said valve cap, said switch being actuated in response to pressure transmitted through said minute opening, and an alarm system connected to said switch and activated upon the response thereof.

3. In combination, a vehicle wheel having a rim portion with an opening therein, said rim portion being adapted to carry a pneumatic tire thereon, an inflation valve for said tire having a barrel portion mounted in said opening in said rim, and a movable obturating element disposed in said barrel portion, said valve having a minute opening for bypassing said obturating element, a removable cup-shaped valve cap for closing the outer end of said barrel portion, a pressure sensitive circuit closing device contained within said valve cap being sensitive to a predetermined tire pressure communicated to it through said minute opening, and a flexible electrical conductor for connecting the circuit closing device to an alarm device, said conductor being attached to said wheel and retaining said valve cap thereto.

References Cited by the Examiner

UNITED STATES PATENTS

| 1,800,196 | 4/31 | Bennett | 340—58 |
| 2,135,303 | 11/38 | Greene | 340—58 |
| 2,331,571 | 10/43 | Risser | 200—61.25 |
| 2,562,862 | 7/51 | Gunter | 340—58 X |
| 2,716,167 | 8/55 | Jacobus | 200—61.25 |
| 2,729,712 | 1/56 | Sprague | 200—61.25 |
| 2,966,563 | 12/60 | Bobenhausen | 340—58 X |

NEIL C. READ, *Primary Examiner.*

BENNETT G. MILLER, *Examiner.*